Figure 1:
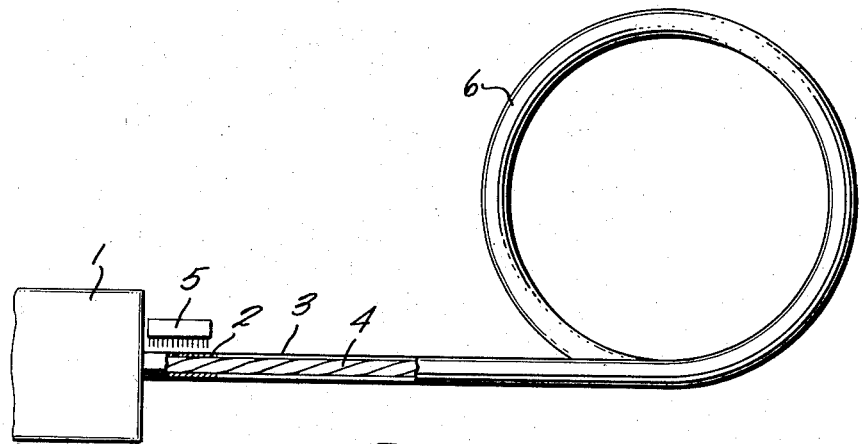

Jan. 20, 1959  U. RAYDT ET AL  2,869,220
PROCESS AND ARRANGEMENT FOR THE PRODUCTION OF CABLES AND
CONDUCTORS HAVING A CORRUGATED SHEATHING, MORE
ESPECIALLY A METAL SHEATHING
Filed June 21, 1954  3 Sheets-Sheet 1

INVENTORS.
ULRICH RAYDT &
KARL HEINZ HAHNE
BY
ATTORNEY

Jan. 20, 1959 U. RAYDT ET AL 2,869,220
PROCESS AND ARRANGEMENT FOR THE PRODUCTION OF CABLES AND
CONDUCTORS HAVING A CORRUGATED SHEATHING, MORE
Filed June 21, 1954 ESPECIALLY A METAL SHEATHING
3 Sheets-Sheet 2
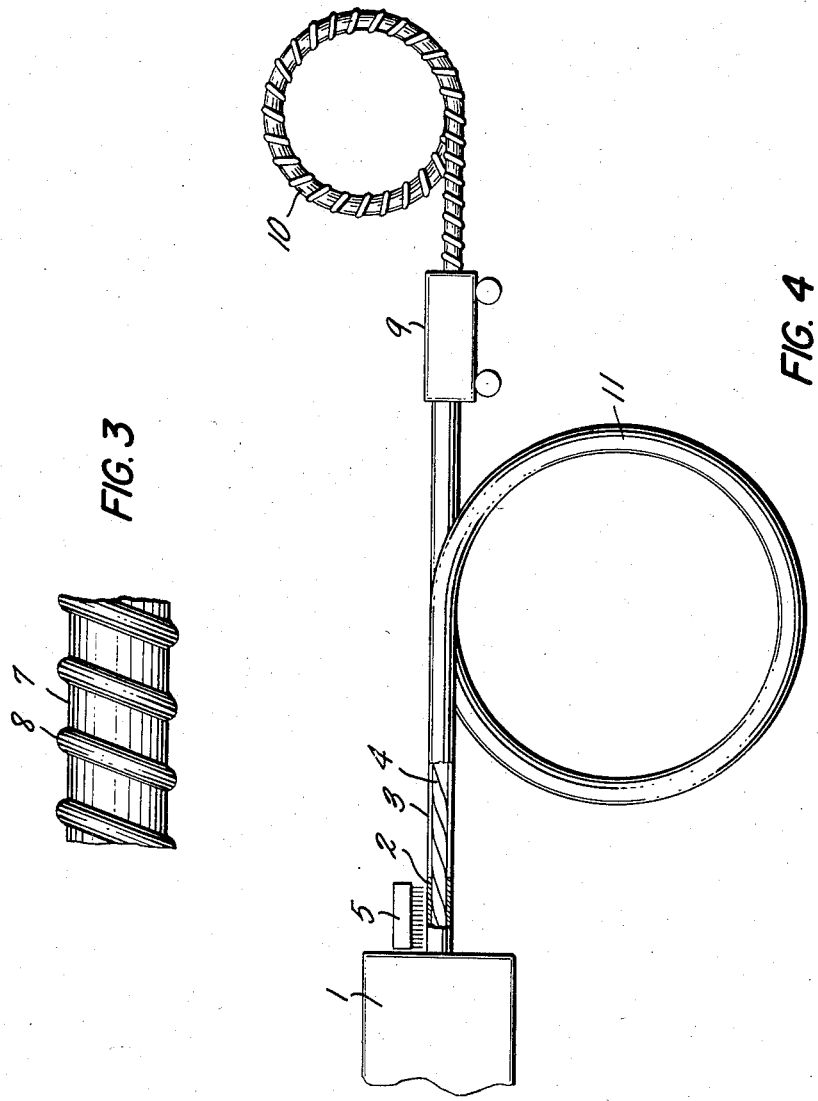
INVENTORS.
ULRICH RAYDT &
KARL HEINZ HAHNE
BY
ATTORNEY.

United States Patent Office 2,869,220
Patented Jan. 20, 1959

2,869,220

PROCESS AND ARRANGEMENT FOR THE PRODUCTION OF CABLES AND CONDUCTORS HAVING A CORRUGATED SHEATHING, MORE ESPECIALLY A METAL SHEATHING

Ulrich Raydt and Karl Heinz Hahne, Osnabruck, Germany, assignors to Osnabrücker Kupfer- und Drahtwerk, Osnabruck, Germany Application June 21, 1954, Serial No. 438,196

Claims priority, application Germany June 29, 1953

4 Claims. (Cl. 29—155.5)

The invention relates to a process and an arrangement for the production of cables and conductors having a corrugated sheathing, more especially a metal sheathing. It has already been proposed to produce metal-covered cables and conductors by laying the cable core along a straight path, at the end of which the sheathing press is arranged. The sheathing is extruded in the form of a tube having an internal diameter appropriately larger than the external diameter of the core and is simultaneously drawn over the laid-out cable core, the beginning of the core being either directly connected to or magnetically held against the pressing tool. The cable sheathing is thereafter applied tightly around the core by any desired method.

It is also known so to arrange the press that the nozzle thereof terminates in a hollow mandrel through which the cable core is guided, while the metal sheathing is formed over this hollow mandrel. The metal sheathing therefore also has a larger diameter than the core in this case. The sheathing is cooled to such an extent on the hollow mandrel that the core is protected from burning. Disposed behind the press is a tool, by means of which the cable sheathing is made to bear against the cable core, so that the finally covered cable or conductor can be wound on to a drum beyond this device.

The first-mentioned process is attended by the disadvantage that for the manufacture of the cable a long path is required along which the cable core and the sheathing must be protected against external influences by special measures. In the second process a draw plate is generally employed to apply the sheathing tightly against the cable core. The cable sheathing thus produced is cylindrical, but has only limited flexibility, since the metal is subjected to considerable deformation by the drawing operation and is thus stiffened. It is known to produce flexible cables by applying the sheathing tightly against the core, not in the form of a smooth cylinder, but in corrugated form, so that the tool employed to apply the sheathing against the core in the second process must be arranged as a corrugating device. However, there is no known corrugating device which does not exert a torsional moment on the cable sheathing. This torsional moment cannot be absorbed either by the finished, corrugated cable or by the sheathing tube leaving the press in the soft state. The idea might be conceived of cancelling out the torsional moment by protecting the tube against twisting by means of a device consisting of members in the form of clamping jaws, which travel in caterpillar fashion over a certain distance together with the cable and clamp the tube fast. However, it has been found in practice that either the pressure of the jaws must be so great that the tube is thereby damaged or that the device must be so long that a certain torsion is set up between the beginning and end of the traction device as a result of the unavoidable loose play.

The invention has for its object to obviate the disadvantages of these two processes, and to this end resides first in so performing the corrugation of the tube that no difference in length is produced between the uncorrugated tube and the corrugated tube. This can be achieved by appropriate choice of the corrugating device. At each corrugation, a part of the cable sheathing is caused to bear firmly against the core, while another part extends in the form of corrugations from the cylindrical contour of the sheathing. In the part applied firmly against the cable core, the sheathing undergoes an increase in length, exactly as occurs over the whole length when it is drawn on by means of a drawing tool. In the corrugations, on the other hand, the sheathing is shortened. The said increase in length and the said shortening must be made to cancel one another out, which can readily be achieved by appropriately fashioning the corrugating tool. The result is thus attained that no relative movement occurs between the cable core and the sheathing, the necessity to hold the tube with the cable core therein in the stretched condition is thereby obviated. It is thus possible first to wind the tube with the core lying loosely therein on to a drum of appropriate diameter beyond the press. In a second working operation, the tube is then guided with the core lying loosely therein through the corrugation arrangement and wound on to a drum in the form of a completely covered cable beyond this arrangement. The torsion set up by the corrugation is taken up by the tube held on the rotating drum and by this drum.

Alternatively, the tube leaving the press, with the core situated therein, may first be guided to a draw-off device, fed from the latter to the corrugation arrangement and directly wound on to a drum after passing through this arrangement. This method of carrying out the process permits of manufacturing the completely corrugated cable or conductor in one operation. The torsion set up in the corrugation is taken up by the tube lying on the draw-off device. The draw-off device may consist, for example, of a disc of such large diameter that the hollow tube can be bent over it without damage.

The invention affords the following advantages:

The long laying-out path hitherto required is dispensed with, wheerby a considerable amount of space is saved. In addition, the manufacturing process as such is simpler and less complicated. The whole arrangement can be accommodated in a shed of normal dimensions. Moreover, it is no longer necessary to employ special devices to take up the torsion. The torsion imparted to the cable by the corrugation arrangement is taken up in a simple and reliable manner. A further advantage of the new process resides in that it is no longer essential to effect the corrugation immediately after the application of the sheathing to the core, but the initially worked cable may be wound on to drums and the corrugation may be carried out at a time and a place independent of the application of the jacket. The drums employed for this purpose may be of any diameter, so that the hollow tube is not unduly stressed, because they only serve for the transport of the hollow table to the point at which the corrugation is effected. The completely corrugated cable then has the normal flexibility so that it can be wound on to drums of normal diameter. In addition to these advantages, the advantage of the second of the two arrangements hereinbefore described is maintained, which resides in that while within the press and after leaving the press nozzle the cable can be guided by a hollow mandrel, so that it does not come into contact with the sheathing until the latter has cooled down sufficiently.

The second method of carrying out the process according to the invention resides in that the cable is completely covered and corrugated in one working operation. It has proved readily possible in practice to adapt the working speed of the corrugation arrangement to the pressing speed.

Figure 2:
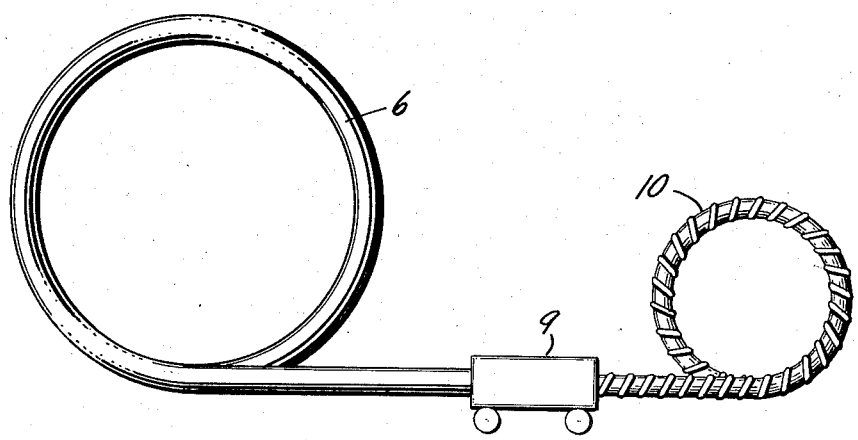
Figure 6:
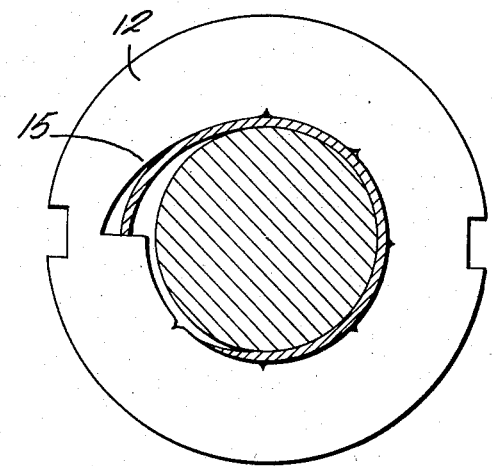
Figure 5:
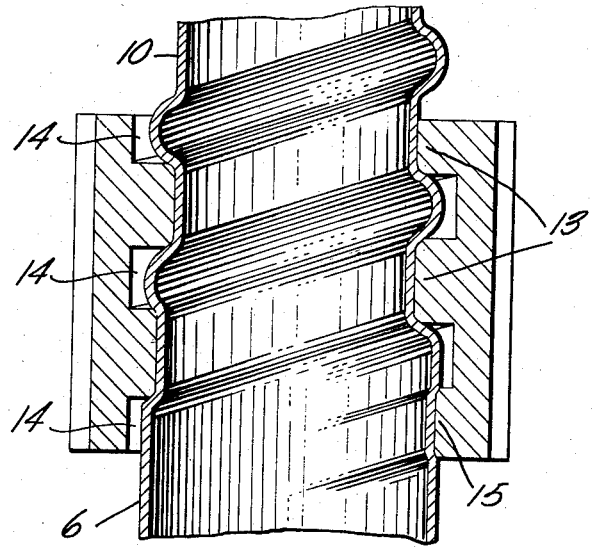

A number of embodiments of the invention are diagrammatically illustrated in the accompanying drawings, in which:

Figure 1 illustrates the pressing of the tube and the winding thereof on to a drum with the cable core lying therein, Figure 2 shows the further working of the tube with the cable core lying therein to form the finished cable, Figure 3 illustrates one method of effecting the corrugation according to the invention, Figure 4 shows the pressing of the sheathing around the cable core and the corrugation of the sheathing in one operation, Figure 5 shows a section of a corrugating die that may be used to corrugate the sheathing, and Figure 6 shows the device of Fig. 5 in section.

In Figure 1, 1 is a sheathing press of normal construction, the nozzle of which terminates in a hollow mandrel 2 over which the sheathing tube 3 is extruded. The cable core 4 travels through the press and through the nozzle at the same time. The nozzle is cooled in the normal manner by a cooling device 5, the simplest form of which is that of a spray. On leaving the nozzle, the cable sheathing 3 has thus been cooled to such an extent that it cannot cause damage to the core due to excessive temperature in its further travel.

The cable sheathing is pressed around the core in known manner, the internal diameter of the sheathing being larger than the external diameter of the core, so that the core lies in the cable sheathing with clearance. The tube thus formed, with the core therein, is then wound on to a drum 6.

As shown in Figure 2, the tube with the core therein is drawn from the drum 6, guided through the corrugating arrangement 9 and wound in the corrugated condition on to the drum 10. The diameter of the drum 6 is preferably so large that the tube with the core therein can be wound on without damage to the tube. The corrugating arrangement preferably consists of a tool which fashions the corrugation in spiral form out of the cable jacket. A particular speed of rotation of the corrugating arrangement must be accompanied by a particular pull-through speed of the tube, and the speed at which it is drawn off the drum 10 would therefore have to be adapted exactly to this speed. This is especially true since both the sheath forming and the corrugating must be performed at a substantially uniform rate and any acceleration or deceleration of these processes must be carefully regulated. In order to avoid having the speeds of extrusion or the speed of corrugation cause either slack or tension in the cable, the corrugating arrangement 9 is made movable, so that if the drum 10 runs too rapidly, the arrangement 9 moves from left to right, while if it runs too slowly, it moves from right to left. By adjustment either of the speed of rotation of the corrugation device or of the speed at which the tube is drawn off the drum 10, the arrangement 9 must be made to stop in order that the two speeds of rotation may be adapted to one another. Small deviations from synchronism are automatically balanced out.

The corrugating tool includes a rotary die shown in Figs. 5 and 6. The non-corrugated tube 6 enters from the left into the corrugating tool 12. The corrugating tool is rotatably mounted in a holder and is driven in this holder by a drive device. The corrugating tool 12 includes a number of helical projections 13 which have the profile of the corrugation valley. Between the helical projections 13 helical bores 14 are provided in which the corrugation hills are shaped. The first helical projection 15 has the shape of an Archimedian spiral. When the tool rotates about the tube, the first helical projection 15 gradually presses the corrugation valley into the tube, the corrugation hill remaining in the recess 14. Simultaneously by the winding shape of the tool the tube moves through the tool. The corrugated tube 10 leaves the device in the direction toward the right. The corrugating device is illustrated in Fig. 5 in vertical section and in Fig. 6 in vertical cross section.

Figure 3 shows an example of a construction for the corrugation according to the invention. The contour of the sheathing has relatively long cylindrical parts 7 and shorter arcuate parts 8. The ratio of the diameter of the uncorrugated tube to the diameter of the finished cable sheathing at the points 7 and the form of the corrugations 8 must be so adapted to one another that the increase in the length at the points 7 and the shortening at the parts 8 exactly cancel one another out. It has been found that particularly favourable conditions are obtained if the width of the parts 8 bears the same ratio to the width of the parts 7 as the width of the parts 7, to the total width of the parts 8 and 7. The desired condition is that the tube shall be neither lengthened nor shortened, in the corrugating operation and this condition is obtained in the described embodiment precisely when flexibility equivalent to that of normal lead cable sheathings is produced by the corrugation.

Figure 4 shows the second method of carrying out the process. The press 1, from the nozzle of which the hollow mandrel 2 extends, presses the excessively wide tube 3, which is cooled by the device 5, around the cable core 4. The tube with the core therein travels in one or more convolutions over the draw-off disc 11 and thereafter through the corrugation arrangement 9, which again is adapted to move. After passing through the corrugation arrangement 9, the finished cable is wound on to the cable drum 10. The diameter of the draw-off disc 11 is again so chosen that the sheathing tube can be bent around this disc without damage.

While cables are primarily referred to in the foregoing, this is not intended to imply any limitation, and it will be appreciated that the invention is also applicable to the manufacture of electric conductors of all kinds which are to be provided with a corrugated sheathing.

Apart from lead, any metal may be employed which can be pressed as a seamless tube, such for example as aluminium, aluminium alloys and metals of high melting point such as copper, copper alloys, titanium, titanium compounds or steel, since the pressing temperatures are withheld from the cable core by means of the hollow mandrel. If desired, the hollow mandrel may be so designed that a cooling medium may be passed therethrough.

The invention is also applicable in cases where the sheathing is not produced by pressing, but is fashioned in a manner known per se from sheet-metal strips and joined together by welding, soldering or sticking.

In addition to metals, plastics of suitable plasticity may be employed as material for the cable sheathings.

We claim:

1. The process of producing metal sheathed cable comprising the steps of extruding a metal sheath loosely about a cable, feeding the loosely sheathed cable to a corrugating machine at a constant speed, and corrugating said sheathing to bring the troughs into snug engagement with said cable, the proportioning of the length of the troughs to the height of the crests of the corrugations being such that the speed of cable and sheathing to and from the corrugation step of the process is the same whereby the assemblage is formed without longitudinal relative movement between the cable and the sheathing.

2. The process of claim 1, in which the troughs of the corrugations are cylindrical and the width of the corrugation crests bears the same ratio to the width of the troughs as the width of the troughs bears to the total width of the troughs and crests in the corrugation.

3. Process according to claim 1, wherein the tube as extruded and with the core loosely contained therein is wound onto a drum of large diameter, and in the tube with the core therein is subsequently wound off the drum at an independent time and place and is guided through a corrugation arrangement, and the cable surrounded by the completely corrugated sheathing is thereafter wound on drums of normal diameter.

4. Process according to claim 1, wherein the tube with the core therein is guided in one or more convolutions around a draw-off device of large diameter and is thereafter guided through a corrugating device by the draw-off device in the same working operation, whereafter the completely corrugated tube together with the core is wound onto a drum of normal diameter.

References Cited in the file of this patent

UNITED STATES PATENTS

| | | |
|---|---|---|
| 275,408 | Philips | Apr. 10, 1883 |
| 435,629 | Holcombe | Sept. 2, 1890 |
| 830,695 | Witzenmann | Sept. 11, 1906 |
| 1,233,807 | Read | July 17, 1917 |
| 2,657,617 | Hussnigg | Nov. 3, 1953 |
| 2,751,077 | Latin et al. | June 19, 1956 |

FOREIGN PATENTS

| | | |
|---|---|---|
| 514,893 | Belgium | Nov. 14, 1952 |